United States Patent [19]

Petcen

[11] Patent Number: 4,494,344
[45] Date of Patent: Jan. 22, 1985

[54] WRINKLE PREVENTION FRAME FOR LENS MANUFACTURE

[75] Inventor: Donald H. Petcen, Colonial Heights, Va.

[73] Assignee: Coburn Optical Industries, Inc., Muskogee, Okla.

[21] Appl. No.: 487,658

[22] Filed: Apr. 22, 1983

[51] Int. Cl.³ .............................................. D06C 3/08
[52] U.S. Cl. .................................... 38/102.2; 156/323
[58] Field of Search ....................... 156/323; 160/380; 38/102.2; 425/DIG. 808, 48; 264/265, 259

[56] References Cited

U.S. PATENT DOCUMENTS

| | | | |
|---|---|---|---|
| 2,957,269 | 10/1960 | Nohl et al. | 38/102.2 |
| 3,596,385 | 8/1971 | Tachibana | 38/102.2 |
| 3,818,620 | 6/1974 | Field et al. | 38/102.2 |
| 3,885,333 | 5/1975 | Zachary | 38/102.2 |
| 3,906,647 | 9/1975 | Bates, Jr. | 38/102.2 |
| 4,038,014 | 7/1977 | Dusza et al. | |
| 4,079,529 | 3/1978 | Jennen et al. | 38/102.2 |
| 4,422,250 | 12/1983 | Golan | 38/102.2 |

Primary Examiner—Werner H. Schroeder
Assistant Examiner—Andrew M. Falik

[57] ABSTRACT

A device to prevent optical distortion in glass-plastic composite lenses comprising an open outer ring having adjusting means, an inner ring held by the outer ring, and an elastic material in stretched position covering the inner ring and held in stretched position by a force exerted on the outer ring by the tightening of the adjusting means.

14 Claims, 6 Drawing Figures

U.S. Patent   Jan. 22, 1985   Sheet 1 of 3   4,494,344
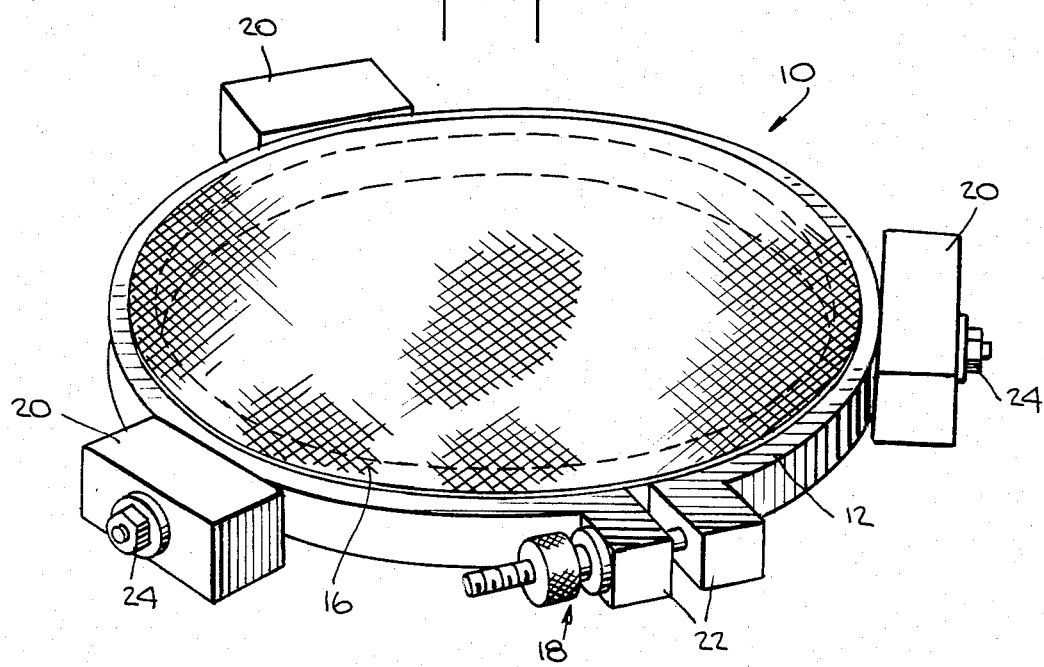
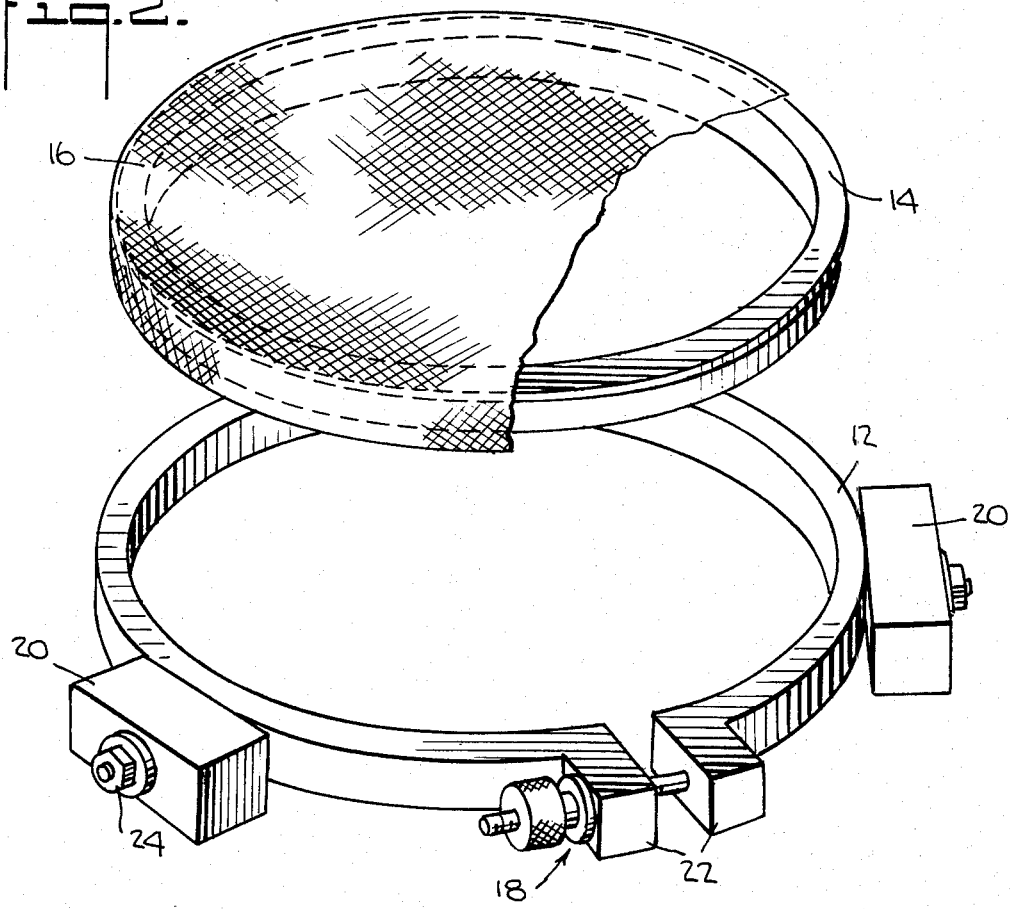

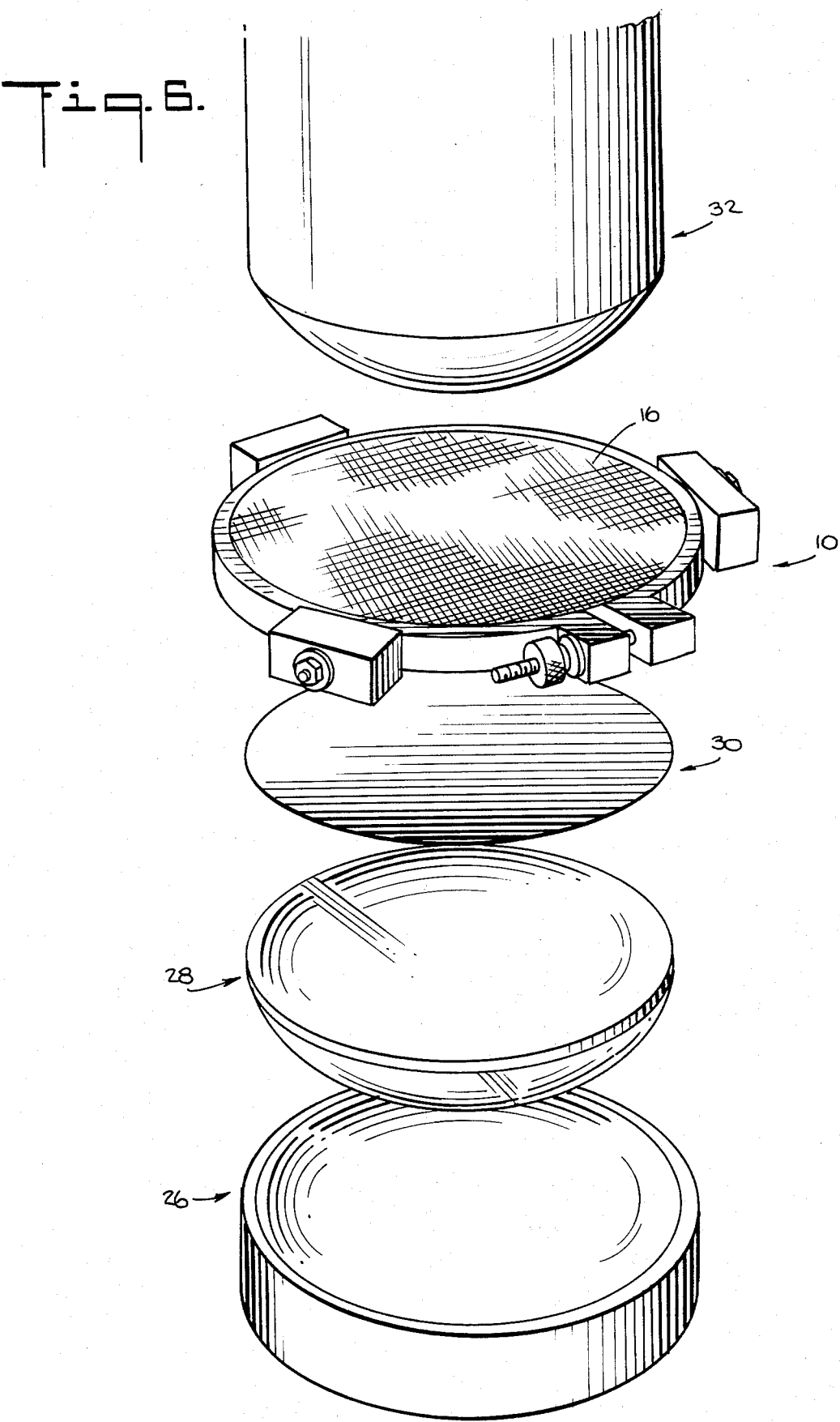

WRINKLE PREVENTION FRAME FOR LENS MANUFACTURE

BACKGROUND OF THE INVENTION

1. Field of the Invention

This invention relates to optical lenses and more particularly to the production of glass-plastic composite ophthalmic lenses.

2. Description of the Prior Art

For many years optical lenses were made of glass. Notwithstanding the advantageous properties of glass for such use, glass ophthalmic lenses are heavy, and fragile. In recent years, plastic materials have come into use for the production of optical components. While plastic optical products are less expensive to manufacture and are lighter in weight than glass, they have the disadvantage of low index of refraction and insufficient resistance to scratch. In an effort to eliminate the disadvantages and combine the advantages associated respectively with glass and plastics, the prior art has produced glass-plastic composites for optical and ophthalmic use. Such composites may comprise an optically clear plastic laminated to a glass lens or a plastic lens body may be sandwiched between two glass shields.

The manufacturing of glass-plastic composites is not free of problems associated with the lamination of two components having different physical characteristics.

A major problem in the production of such composites is the occurrence of distortion and wrinkles in the flat plastic disc upon its lamination to the aspherical or toroidal shape glass component of the composite as will be described briefly hereunder.

In a typical procedure of making composites, an inorganic glass, prefinished by grinding the polishing to prescription on both of its major surfaces, is bonded to an organic, optically clear plastic material. The plastic material may be of a single layer or may be a composite of two layers, one of which serves as an adhesive promoting adherence of the plastic material to the glass component of the composite. This plastic material is in the form of individual flat wafers. The lamination process includes prepositioning the glass over the wafer, applying pressure to the wafer surface using a pressing means such as a plunger designed to allow center to edge spreading of the wafer, and bonding the components together in an autoclave under appropriate temperature and pressure.

It has been found that the application of a plunger to accomplish lamination of the components caused distortions and wrinkles in a large percentage of the composites.

It is the principle object of the present invention to provide an apparatus for producing high quality glass-plastic composite optical products.

It is a further object of the invention to provide a method for producing high quality glass-plastic composite optical products by which a large percentage of loss as rejects is eliminated.

SUMMARY OF THE INVENTION

In accordance with the invention, the aforesaid objects are accomplished by:

(a) providing a lens blank mold or holder of a cup shape element having a concave optical surface;

(b) placing a prealigned, adhesively attached composite of a preformed glass and a flat optically clear plastic wafer into said lens blank mold or holder;

(c) proximately positioning a stretched elastic material over said glass-wafer composite using a doughnut-shape wrinkle preventor ring supporting said stretched elastic material and (d) exerting a force on the stretched elastic material against said glass-wafer composite by a soft plunger and pressing the lens components against one another to effect lamination thereof.

BRIEF DESCRIPTION OF THE DRAWINGS

FIG. 1 is a perspective view of the wrinkle preventor ring;

FIG. 2 is a perspective view of the main components in unassembled positions of the wrinkle preventor ring of FIG. 1;

FIG. 6 is a perspective view of a lens-laminating mechanism showing in superimposed positions with respect to each other a lens blank holder, a glass lens, a plastic wafer, the wrinkle preventor ring, and a plunger.

DETAILED DESCRIPTION OF THE DRAWINGS

Figure 3:
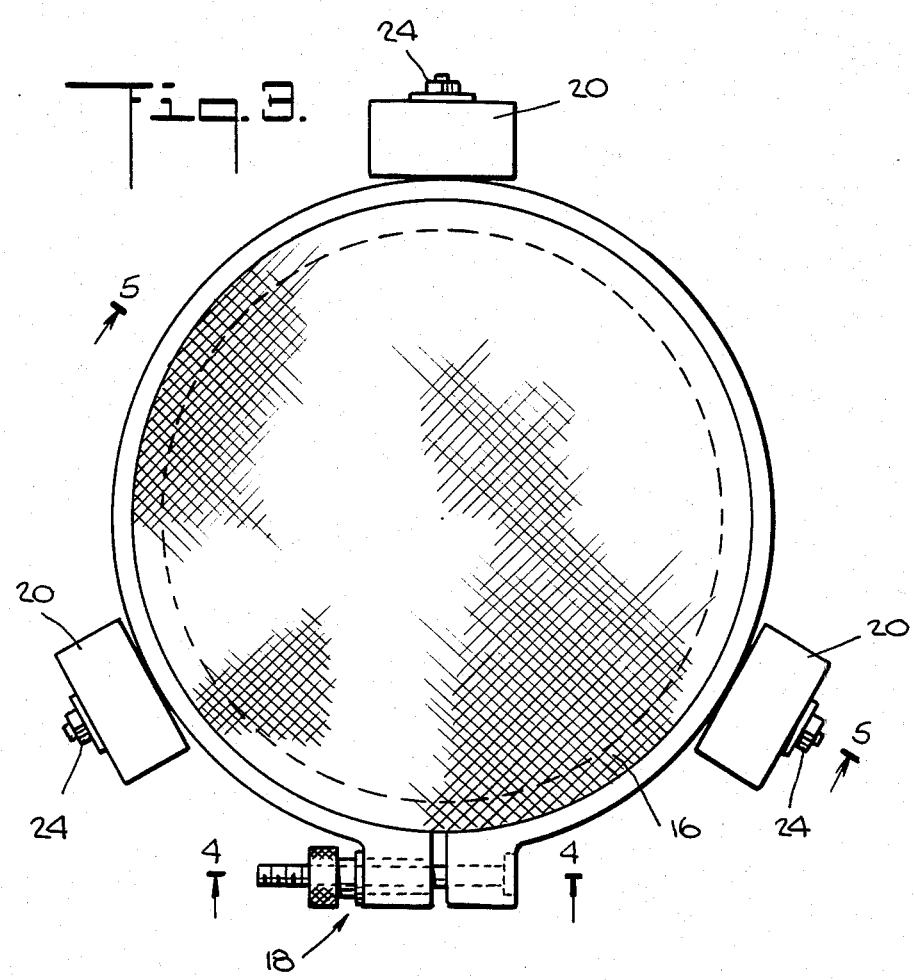
FIG. 3 is a top plan view of the wrinkle preventor ring.
Figure 4:
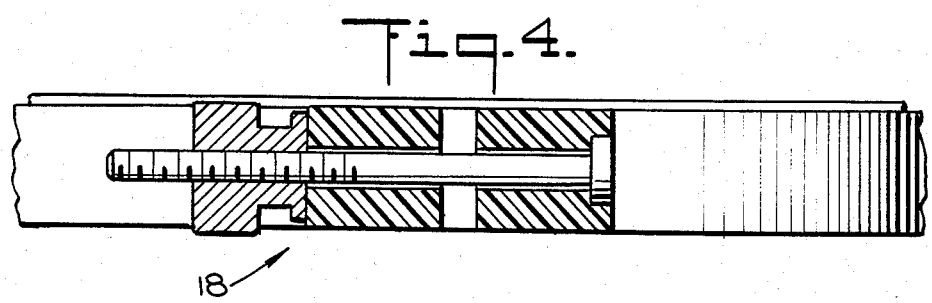
FIG. 4 is a cross sectional view of the tensioning means taken along the line 4—4 of FIG. 3.
Figure 5:
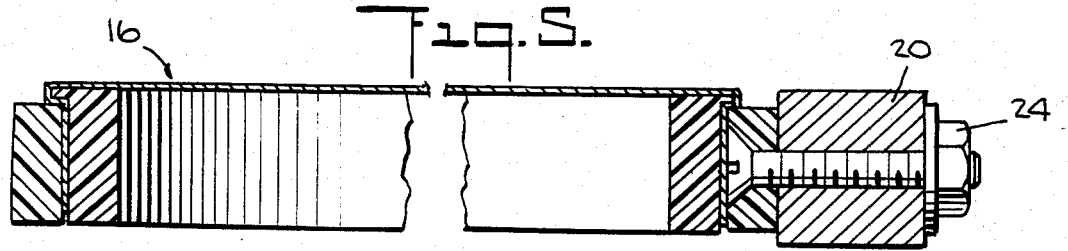
FIG. 5 is a cross sectional view of the wrinkle preventor ring taken along the line 5—5 of FIG. 3.

Reference is now made to FIGS. 1, 2, 3, 4 and 5. FIG. 1 shows the wrinkle preventor ring 10 of the present invention having as its main components: open outer ring 12 made of a strong flexible material, such as metal or plastic; inner ring 14 made of a resilient plastic material and having a smaller circumference than outer ring 12; and a stretched woven or knit fabric 16 of polyester, nylon, rubber or other extensible material with memory positioned over inner ring 14. Open outer ring 12 (FIG. 2) terminates in two parallel protrusions 22 which are adaptd to receive a tensioning or adjusting means 18. Suitable adjusting means include a threaded rod equipped with a nut. Open ring 12 is further equipped with weight 20 (FIGS. 1, 2 and 3), which is fastened to open ring 12 by fastening means 24 (FIGS. 1, 2, 3 and 5).

Referring to FIG. 6, lens blank mold or holder 26 having a concave optical surface serves to receive glass lens 28. A flat, optically clear plastic wafer 30 is positioned over and aligned with said glass lens 28. Superimposed over lens blank mold or holder 26, containing glass lens 28 and flat plastic wafer 30, is positioned wrinkle preventor ring 10. Lamination of glass lens 28 and flat plastic wafer 30 is accomplished by exerting force via plunger 32 upon stretched fabric 16 of wrinkle preventor ring 10.

The wrinkle preventor ring 10, as indicated earlier, is provided with an extensible knit or woven fabric 16 in a stretched condition having a memory. Fabric 16 is stretched over inner ring 14 which is placed in open outer ring 12. By tightening adjusting means 18 outer ring 12 is forced against inner ring 14 and fabric 16 is firmly held therebetween.

The wrinkle preventor device of the present invention may be used in the manufacture of composite lenses in which at least two layers of materials, at least one of which is polymeric, are pressed together to form the final laminate. More particularly the device is used to circumvent the formation of wrinkles that form in the flat optical plastic disk or wafer when the same is laminated to a glass lens. Such wrinkles result in optical distortion making the finished product unsuitable for the intended use. The wrinkle preventor acts to distribute the force applied to the layers via a plunger resulting in a very substantial reduction of rejects due to optical distortion.

Typically, the lamination process is accomplished as follows:

After manufacture, the optical glass is cleaned and stored in a clean room to await lamination to an optical flat wafer. The wafer, after manufacture, is similarly cleaned. The two components are prepositioned or brought together via a pre-adhesion of the wafer to the glass by suitable means, such as by blowing the wafer against the glass surface in a vacuum system. The prepositioned components are then placed into lens blank mold or holder 26 having a concave optical surface. Wrinkle preventor ring 10 is then placed over lens holder 26. Stretched fabric 16, held in taut position and forced against lens holder 26 by the weight of said wrinkle preventor ring and weights 20 secured thereto, has no contact with the prepositioned lens components until plunger 32 is lowered against it stretching the same toward plastic wafer 30. Through the plunger a predetermined force is applied against the lens components. The stretched elastic fabric between plunger 32 and plastic wafer 30 distributes the downward force of the plunger and prevents wrinkle formation in said wafer. Upon application of the predetermined force, the lamination having been accomplished, the laminate is removed from lens holder 26 to be autoclaved, inspected and packaged.

While the present invention has been illustrated and described by means of preferred embodiments, it is to be understood that various changes and modifications may be made therein without departing from the spirit and scope of the invention as defined by the appended claims.

What is claimed is:

1. A device to prevent optical distortion in glass-plastic composite lenses during lamination thereof comprising:
    an open outer ring of a flexible material equipped with adjusting means, said open outer ring having weights positioned thereon;
    an inner ring held by said outer ring; and
    an elastic material in stretched position covering said inner ring and maintained in stretched position by a force exerted on said outer ring by the tightening of said adjusting means.

2. The device of claim 1 wherein said open outer ring ends in parallel protrusions for receiving said adjusting means.

3. The device of claim 2 wherein said adjusting means comprises:
    a threaded rod connecting said protrusions; and nut means mounted on said threaded rod serving to adjust the respective positions of said protrusions.

4. The device of claim 1 wherein said open outer ring is of metal.

5. The device of claim 4 wherein said open outer ring is of iron.

6. The device of claim 1 wherein said open outer ring is of a metal alloy.

7. The device of claim 1 wherein said open outer ring is of plastic.

8. The device of claim 1 wherein said elastic stretched material is nylon.

9. The device of claim 1 wherein said elastic stretched material is polyester.

10. The device of claim 1 wherein said elastic stretched material is rubber.

11. The device of claim 1 wherein said elastic stretched material is a knit fabric.

12. The device of claim 1 wherein said elastic stretched material is a woven fabric.

13. The device of claim 1 wherein said inner ring is of a resilient material.

14. The device of claim 1 wherein said inner ring is a polymeric material.

* * * * *